US012355622B2

(12) United States Patent
Chen et al.

(10) Patent No.: US 12,355,622 B2
(45) Date of Patent: Jul. 8, 2025

(54) METHOD, DEVICE, AND COMPUTER PROGRAM PRODUCT FOR PROCESSING NETWORK CONFIGURATION FILE

(71) Applicant: Dell Products L.P., Round Rock, TX (US)

(72) Inventors: XiongGui Chen, Shanghai (CN); Chris Zhu, Shanghai (CN); Lijun Zhao, Shanghai (CN); Jianfeng Ma, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 81 days.

(21) Appl. No.: 18/525,709

(22) Filed: Nov. 30, 2023

(65) Prior Publication Data

US 2025/0112886 A1 Apr. 3, 2025

(30) Foreign Application Priority Data

Sep. 28, 2023 (CN) .......................... 202311276859.0

(51) Int. Cl.
*H04L 41/084* (2022.01)
*H04L 41/08* (2022.01)
(Continued)

(52) U.S. Cl.
CPC ...... *H04L 41/0846* (2013.01); *H04L 41/0889* (2013.01); *H04L 61/5007* (2022.05); *H04L 2101/668* (2022.05)

(58) Field of Classification Search
CPC ............. H04L 41/0803; H04L 41/0806; H04L 41/084; H04L 41/0846; H04L 41/0876;
(Continued)

(56) References Cited

U.S. PATENT DOCUMENTS

| | | | | |
|---|---|---|---|---|
| 5,838,907 A | * | 11/1998 | Hansen | H04L 41/22 709/224 |
| 2016/0085462 A1 | * | 3/2016 | Buzzard | G06F 3/0629 711/162 |

(Continued)

FOREIGN PATENT DOCUMENTS

| | | | | |
|---|---|---|---|---|
| EP | 1091522 A2 | * | 4/2001 | ......... H04L 41/0846 |
| EP | 2936736 B1 | * | 5/2019 | ........... H04L 41/084 |

OTHER PUBLICATIONS

Leroy, Damien, and Olivier Bonaventure. "Preparing network configurations for IPV6 renumbering." International Journal of Network Management 19.5 (2009): 415-426. (Year: 2009).*

(Continued)

*Primary Examiner* — Vivek Srivastava
*Assistant Examiner* — William C McBeth
(74) *Attorney, Agent, or Firm* — Amin, Turocy & Watson, LLP

(57) ABSTRACT

Processing a network configuration file is described. An example method includes acquiring a network configuration file of a first cluster system, the network configuration file including an original Internet protocol address and acquiring an address translation rule set by a user, the address translation rule including a rule for translating one address of an original network address and an original host address that form the original Internet protocol address. The method further includes acquiring a target Internet protocol address by translating the one address in the original Internet protocol address based on the address translation rule. The method further includes storing the network configuration file including the target Internet protocol address in a second cluster system. Through the method, a simple Internet protocol address translation rule can be utilized to flexibly adjust network configurations in a customized and auto- (Continued)

mated manner, thereby improving the processing efficiency and user experience.

20 Claims, 5 Drawing Sheets

(51) Int. Cl.
    *H04L 61/5007*    (2022.01)
    *H04L 101/668*    (2022.01)

(58) Field of Classification Search
    CPC ............. H04L 41/0883; H04L 41/0886; H04L 41/0889; H04L 41/20; H04L 41/22; H04L 41/26; H04L 61/5007; H04L 61/5046
    See application file for complete search history.

(56) References Cited

U.S. PATENT DOCUMENTS

| | | | | |
|---|---|---|---|---|
| 2018/0081664 A1* | 3/2018 | Sagiraju | ............... | H04L 41/5054 |
| 2021/0150060 A1* | 5/2021 | Dash | ................... | H04L 41/0813 |
| 2021/0216568 A1* | 7/2021 | Gupta | ................. | G06F 16/1827 |
| 2022/0417093 A1* | 12/2022 | Lindholm | ........... | H04L 61/5007 |

OTHER PUBLICATIONS

Wikipedia contributors. "IP address." Wikipedia, The Free Encyclopedia. Wikipedia, The Free Encyclopedia, Mar. 27, 2025. Web. Apr. 16, 2025. (Year: 2025).*

\* cited by examiner

400

```
"network": {
  "subnet": {
    "groupnet0.subnet0":   "10.205.24.0/22",
    "10.205.31.0/24":      "10.205.28.0/22",
  }
}
```

500

| | | |
|---|---|---|
| | 10 . 42 . 175 . 1 / 24 | 00001010 . 00101010 . 10101111 . 0000001 |
| + | 10 . 205 . 28 . 0 / 22 | 00001010 . 11001101 . 00011100 . 0000000 |
| | 10 . 205 . 31 . 1 / 22 | 00001010 . 11001101 . 00011111 . 0000000 |

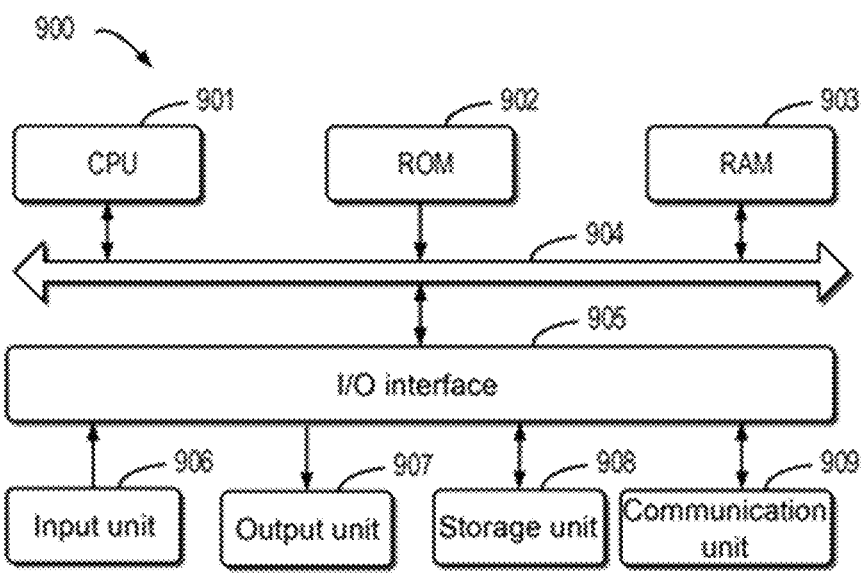

METHOD, DEVICE, AND COMPUTER PROGRAM PRODUCT FOR PROCESSING NETWORK CONFIGURATION FILE

RELATED APPLICATION

The present application claims the benefit of priority to Chinese Patent Application No. 202311276859.0, filed on Sep. 28, 2023, which application is hereby incorporated into the present application by reference herein in its entirety.

TECHNICAL FIELD

Example embodiments of the present disclosure generally relate to the field of data processing, and in particular, to a method, a device, and a computer program product for processing a network configuration file.

BACKGROUND

With the development of computer technologies, in order to meet requirements of processing large amounts of data and high-performance computing, a plurality of computers or servers are connected together to form a cluster system that shares resources and works collaboratively. A cluster system can improve the computing power, reliability, scalability, and fault tolerance.

The development of cluster systems has undergone several stages, including high-performance computing clusters, high-performance computing clusters, distributed computing clusters, and container orchestration clusters. With the development of the cluster systems, they have been widely applied in fields such as cloud computing, big data processing, artificial intelligence, and machine learning. In a cluster system, backing up and restoring system configurations is a common operation used for protecting the system from data loss or replicating the system for obtaining high availability. However, there are still many issues that need to be addressed when backing up and restoring system configurations or replicating system configurations in a cluster system.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

Example embodiments of the present disclosure provide a method, a device, and a computer program product for processing a network configuration file.

According to a first example embodiment of the present disclosure, a method for processing a network configuration file is provided. The method includes acquiring a network configuration file of a first cluster system, the network configuration file including an original Internet protocol address. The method further includes acquiring an address translation rule set by a user, the address translation rule including a rule for translating one address of an original network address and an original host address that form the original Internet protocol address. The method further includes acquiring a target Internet protocol address by translating the one address in the original Internet protocol address based on the address translation rule. The method further includes storing the network configuration file including the target Internet protocol address in a second cluster system.

According to a second example embodiment of the present disclosure, an electronic device is provided. The electronic device includes at least one processor; and a memory, coupled to the at least one processor and having instructions stored thereon, wherein the instructions, when executed by the at least one processor, cause the device to perform actions including: acquiring a network configuration file of a first cluster system, the network configuration file including an original Internet protocol address; acquiring an address translation rule set by a user, the address translation rule including a rule for translating one address of an original network address and an original host address that form the original Internet protocol address; acquiring a target Internet protocol address by translating the one address in the original Internet protocol address based on the address translation rule; and storing the network configuration file including the target Internet protocol address in a second cluster system.

According to a third example embodiment of the present disclosure, a computer program product is provided. The computer program product is tangibly stored on a non-volatile computer-readable medium and includes machine-executable instructions, wherein the machine-executable instructions, when executed, cause a machine to perform steps of the method in the first aspect of the present disclosure.

BRIEF DESCRIPTION OF THE DRAWINGS

By more detailed description of exemplary embodiments of the present disclosure with reference to the accompanying drawings, the above and other objectives, features, and advantages of the present disclosure will become more apparent, wherein identical reference numerals generally represent identical components in the exemplary embodiments of the present disclosure.

FIG. 7 illustrates a schematic diagram of an example of an address translation rule of an interface according to an embodiment of the present disclosure;

FIG. 8 illustrates a schematic diagram of an example of an address translation rule of a host according to an embodiment of the present disclosure; and FIG. 9 illustrates a schematic block diagram of an example device suitable for implementing an embodiment of the present disclosure.

In various accompanying drawings, identical or corresponding reference numerals represent identical or corresponding parts.

DETAILED DESCRIPTION

Figure 1:
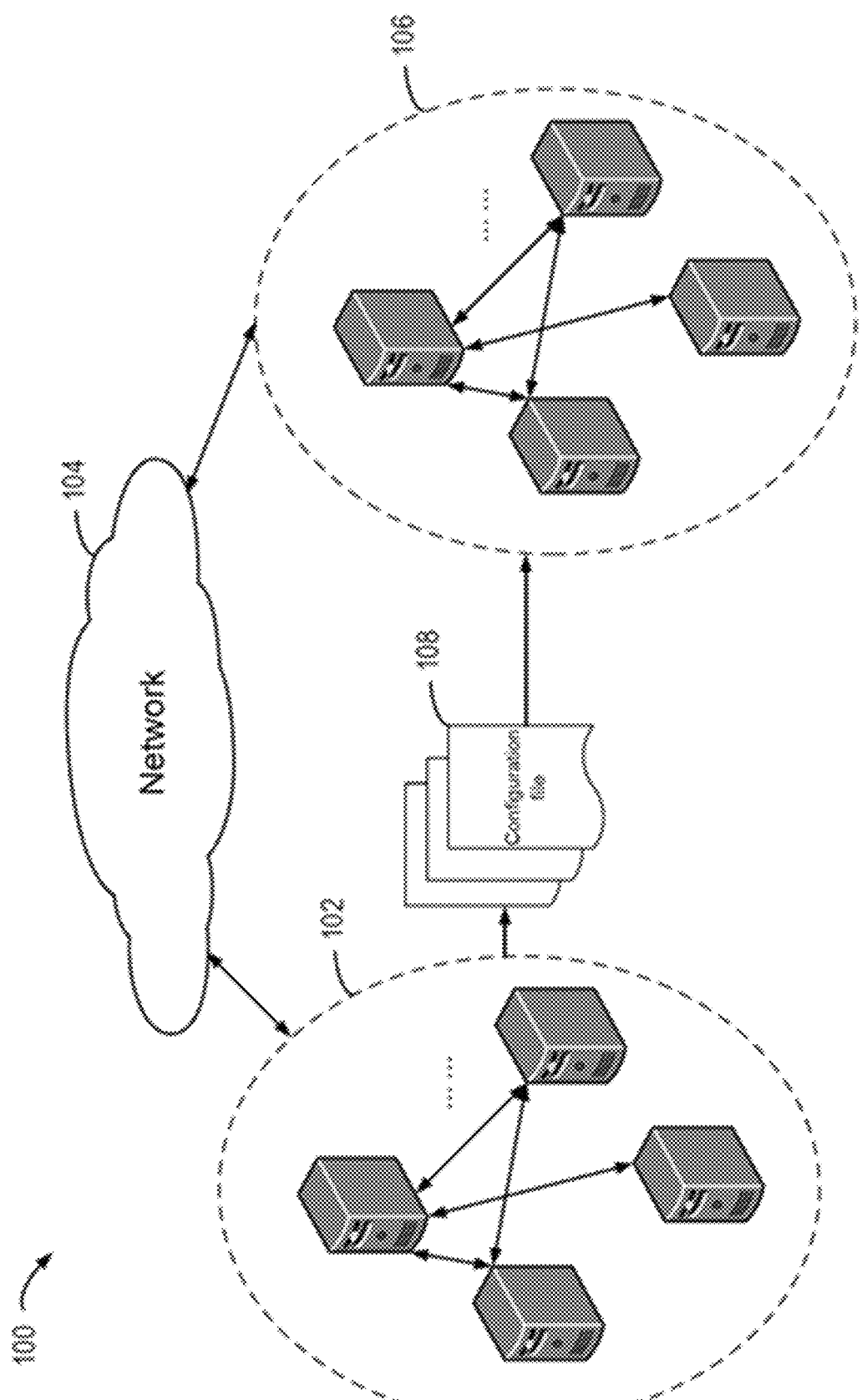
FIG. 1 illustrates a schematic diagram of an example environment in which a device and/or a method according to an embodiment of the present disclosure can be implemented.

The embodiments of the present disclosure will be described below in further detail with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the scope of protection of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As mentioned above, there are still many issues that need to be addressed when backing up and restoring system configurations or replicating system configurations in a cluster system. For example, among the various configurations of a cluster system, network configurations of the system may be the most complex, especially for a large cluster system. If Internet Protocol (IP) addresses are managed by the cluster system itself rather than assigned by an environment, the network configuration may contain a large number of IP addresses. In this case, when backing up and restoring network configurations or replicating network configurations across two cluster systems, it is usually necessary to make some modifications to the configurations on different systems to avoid IP address conflicts between the two systems in the environment.

However, the backup and restoring process or replication process of network configuration files is usually automatically executed by a program. Additionally, network configurations are often complex and have a hierarchical structure. The network configuration may include a plurality of subnets, pools, and interfaces, with hundreds of IP addresses, such as an IP address range of each pool and a gateway of each subnet. In response to this situation, there are mainly two methods for restoring network configuration in traditional solutions. One method is manually searching and replacing all IP addresses in configuration data before restoring. Another method is preparing a fixed address mapping, passing it to a restoring tool, and running it during a restoring period. It is time-consuming and laborious to pre-build such a large address mapping and modify them all before or after restoring. Therefore, traditional (such as manual) modifications in the restoring process are a challenging task and not easy to implement. In addition, different source or target systems may have different network configurations and IP address ranges, and therefore, fixed address mappings or manual modifications cannot be saved and reused for restoring another set of configurations or restoring on another different system. Therefore, the above method is only applicable to small configuration data and is not reusable.

At least to address the above and other potential problems, the embodiments of the present disclosure provide a method for processing a network configuration file. In the method, a computing device first acquires a network configuration file of a first cluster system. Then, the computing device further acquires an address translation rule set by a user. According to the translation rule, the computing device translates one address of an original network address and an original host address that form an original Internet protocol address in the network configuration file to generate an adjusted target Internet protocol address, which is then stored in a second cluster system for use by the second cluster system. Through the method, a simple Internet protocol address translation rule can be used to translate an address part of the original network address, for flexibly adjusting the network configuration in a customized and automated manner. Moreover, the adjustment process is performed by the computing device and does not require human intervention, thereby improving the processing efficiency and user experience.

The embodiments of the present disclosure will be further described in detail below with reference to the accompanying drawings, wherein FIG. 1 shows an example environment in which a device and/or a method according to an embodiment of the present disclosure can be implemented.

As shown in FIG. 1, the example environment 100 includes a cluster system 102. The cluster system 102 includes a plurality of nodes, and each of the nodes is assigned an IP address. Additionally, IP addresses of nodes within a cluster are managed by the cluster system 102. For the cluster system 102, a corresponding network configuration file 108 may be generated. In one example, the network configuration file 108 is located on a node within the cluster. In another example, the configuration file 108 is distributed across the plurality of nodes within the cluster. The cluster system 102 is connected to a network 104 to interact with the network 104. For the convenience of description, the cluster system 102 may also be referred to as a first cluster system.

FIG. 1 further shows a cluster system 106, which also includes a plurality of nodes. For the convenience of description, the cluster system 106 may also be referred to as a second cluster system. In some embodiments, after the cluster system 102 fails, the cluster system 106 may be used to replace the cluster system 102. At this point, it is necessary to restore the network configuration file 108 in the cluster system 102 to the cluster system 106 for application. In this process, it is necessary to compare the IP addresses in the network configuration file 108 based on a certain address translation rule for adjustment, so as to generate a network configuration file that can be used in the cluster system 106. In some embodiments, if a user wants to use the same configuration method to configure the cluster system 106 after configuring the cluster system 102, he/she may also compare the IP addresses in the network configuration file 108 based on the certain address translation rule for adjustment, so as to generate a network configuration file that can be used in the cluster system 106. The above examples are only used for describing the present disclosure, and are not intended to specifically define the present disclosure.

In some embodiments, when an IP address in the network configuration file of the cluster system 102 is adjusted, it is necessary to receive an address translation rule set by the user. In some embodiments, the address translation rule may include a rule for translating a network address that forms the original Internet protocol address. In some embodiments, the address translation rule may include a rule for translating a host address that forms the original Internet protocol address. Then, the computing device may use the address translation rule to translate the Internet protocol addresses in the network configuration file, thereby adjusting the Internet protocol addresses in the network configuration file. Finally, the adjusted network configuration file is stored in the cluster system 106. The adjustment process of the above network configuration file may be performed on any suitable computing device. In one example, adjustment of the network configuration file is performed on a node in the cluster system 106. In another example, adjustment of the network configuration file is performed on a node in the cluster system 102. In another example, adjustment of the network configuration file is performed on a computing device or node in the network outside of the cluster systems 102 and 106. The above examples are only used for describing the present disclosure, and are not intended to specifically define the present disclosure Through the method, a simple Internet protocol address translation rule can be utilized to flexibly adjust network configurations in a customized and automated manner, thereby improving the processing efficiency and user experience.

The example environment in which the device and/or a method according to the embodiment of the present disclosure may be implemented has been described above with reference to FIG. 1. A schematic diagram of an example of processing a network configuration file according to an embodiment of the present disclosure is described below with reference to FIG. 2.

Figure 2:
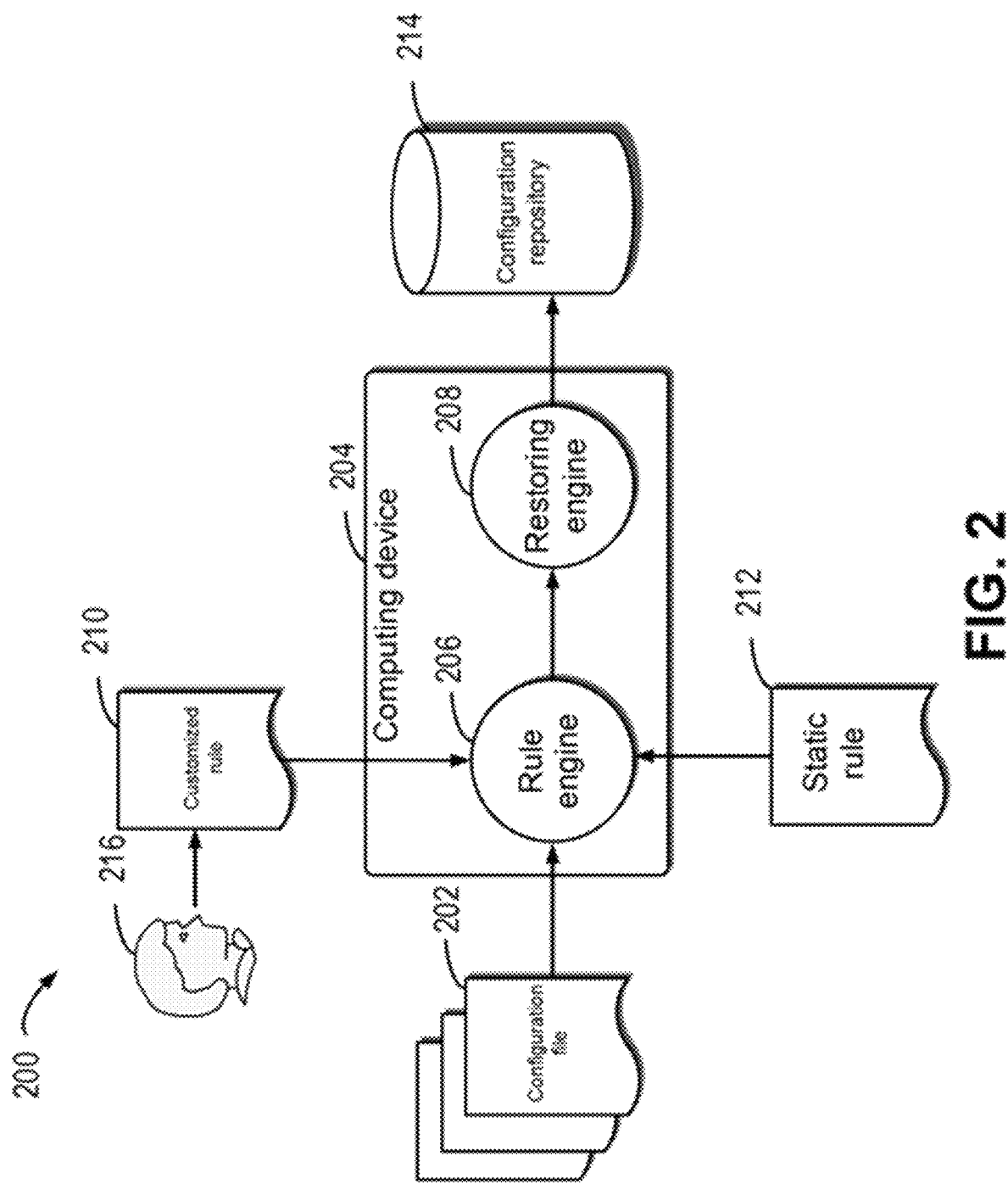
FIG. 2 illustrates a schematic diagram of an example of processing a network configuration file according to an embodiment of the present disclosure.

As shown in FIG. 2, a computing device 204 performs adjustment of a configuration file. The example computing device 204 includes, but is not limited to, a personal computer, a server computer (such as a node in the cluster system 102 or 106 or a node in the network 104 in FIG. 1), a handheld or laptop device, a mobile device, a multiprocessor system, a consumer electronic product, a minicomputer, a mainframe computer, a distributed computing environment including any of the above systems or devices, and the like.

The computing device 204 includes a rule engine 206 and a restoring engine 208, which are used for implementing an adjusting process of a network configuration file of a network cluster. The rule engine 206 is used for acquiring a network configuration file 202 of a first network cluster, such as the network configuration file 108 of the cluster system 102 in FIG. 1. The rule engine 206 applies a rule to configuration data and processes or translates the network configuration file 202 into a mode that can be stored by the restoring engine 208 into a second system cluster.

In some embodiments, the rule used in the rule engine 206 is a JavaScript Object Notation (JSON) data segment. The rule engine 206 has predefined code to interpret rule data and apply it to the network configuration file. There are two rules in the process of restoring or replicating the network configuration file: a customized rule 210 and a static rule 212. The static rule 212 is a set of general rules. Each component in the system may have its own static rules to translate its backed up configuration data into a structure that can be restored or replicated to another cluster system. For example, the static rule includes translating certain fields from name representations to numerical representations or which fields are no longer needed. The static rule is published with the system in the form of a JSON document and cannot be dynamically adjusted. The customized rule 210 is provided by a user 216 when initiating an operation of restoring the network configuration file or replicating the network configuration file. Therefore, the customized rule 210 is temporary and usually based on actual configuration data, so that the restoring process is very flexible. To simplify the use of the customized rule, a command-line interface of the restoring process does not require the user to input the customized rule in a JSON structure. The command-line interface provides the user with simple options to help the user translate a rule parameter into an actual rule.

After being adjusted by the rule engine 206, the network configuration file is stored by the restoring engine 208 in a configuration repository 214 for use by the second cluster system, such as the cluster system 106 in FIG. 1.

Through the method, a simple Internet protocol address translation rule can be utilized to flexibly adjust network configurations in a customized and automated manner, thereby improving the processing efficiency and user experience.

Figure 3:
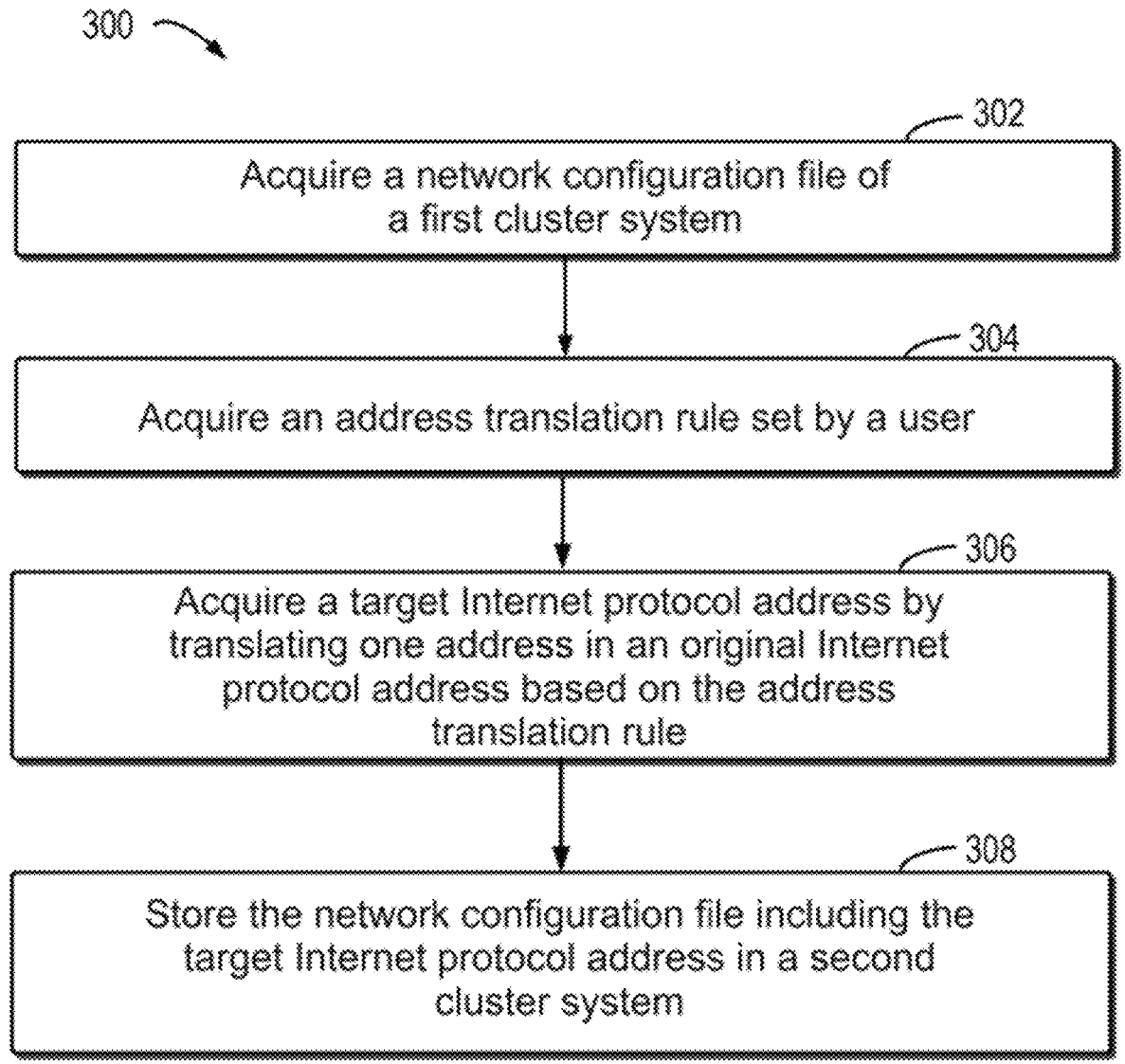
FIG. 3 illustrates a flow chart of a method for processing a network configuration file according to an embodiment of the present disclosure.

The schematic diagram of the example of processing a network configuration file according to an embodiment of the present disclosure is described above with reference to FIG. 2. A flow chart of a method for processing a network configuration file according to an embodiment of the present disclosure is described below with reference to FIG. 3. The method may be performed on a computing device such as the node in the cluster system 102 or 106 or the network 104 in FIG. 1, the computing device 204 in FIG. 2, or any suitable computing device or server.

At a block 302, the computing device acquires a network configuration file of a first cluster system, wherein the network configuration file includes an original Internet protocol address. For example, the computing device may acquire the network configuration file 108 of the cluster system 102. The network configuration file stores all network configuration information related to the cluster system, including a large number of IP addresses related to subnets, pools, and/or interfaces.

At a block 304, the computing device acquires an address translation rule set by a user, where the address translation rule includes a rule for translating one address of an original network address and an original host address that form the original Internet protocol address. For example, the computing device acquires a customized rule 210 defined by the user for adjusting the original Internet protocol address in the network configuration file. For an Internet protocol address, it consists of two parts: a network address and a host address, wherein the network address refers to a part of the IP address used for identifying a network, while the host address is a part used for identifying a host. In IPv4, an IP address is represented by a 32-bit binary number, usually in a dot-decimal notation form. The former part is used for representing the network address, and the latter part is used for representing the host address. In IPv6, an IP address is represented by a 128-bit binary number, usually in the form of a colon separated hexadecimal number. Likewise, the former part is used for representing the network address, and the latter part is used for representing the host address. Alternatively or additionally, the IP address may be represented using a Classless Inter-Domain Routing (CIDR) notation. The CIDR notation is a method used for representing IP addresses and subnet masks, which allows for more flexible partitioning of IP address space and more efficient allocation of network addresses. The CIDR notation uses the "/" symbol to represent the division of the network address and the host address. For example, an address with the CIDR notation of 192.168.1.0/24 indicates that the former 24 bits are the network address and the latter 8 bits are the host address.

In some embodiments, when acquiring the address translation rule set by the user, the computing device acquires Internet protocol address translation information input by the user. Then, the computing device translates the Internet protocol address translation information input by the user into an address translation rule in a predetermined format. For example, to simplify the use of a customized rule, a command-line interface of the restoring process does not require the user to input the customized rule in a JSON structure. The command-line interface provides the user with simple options to help translate a rule parameter into an actual rule in a JSON structure.

At a block 306, the computing device acquires a target Internet protocol address by translating one address in the original Internet protocol address based on the address translation rule. For example, the computing device adjusts, based on the received customized rule 210, one address of the original network address or the original host address in the original Internet protocol address in the network configuration file.

In some embodiments, the computing device needs to adjust the original network address. The computing device first acquires the address translation rule, and at this point, the address translation rule may indicate to translate the original network address to a target network address. Next, the computing device needs to determine whether the network address translation can be successfully performed. In the process, the computing device first determines a first length of the original network address and a second length of the target network address to be translated to. Then, the computing device compares the first length with the second length. If the first length is greater than or equal to the second length, it indicates that the target network address is greater than the original network address. At this point, the address translation may not cause the problem of the host address not being applicable to the target network address. Therefore, the computing device may replace the part of the original Internet protocol address corresponding to the second length with the target network address.

If the first length is less than the second length, the computing device needs to further determine whether any bit of the original Internet protocol address corresponding to a part between the first length and the second length has a predetermined value to determine whether there is an overflow problem, for example, a predetermined value of 1. If there is no predetermined value of 1 for any bit of the original Internet protocol address corresponding to the part between the first length and the second length, it indicates that the translation of the network address part may not result in the problem of the host address being not applicable to the target network address. Therefore, the computing device replaces the part of the original Internet protocol address that corresponds to the second length with the target network address. If there is a predetermined value of 1 for any bit of the Internet protocol address corresponding to the part between the first length and the second length, it indicates that the host address in the original Internet protocol address is not applicable to the target network address, and the application of the address translation rule is prevented at this point.

In some embodiments, the original network address and the target network address are represented by classless inter-domain routing annotations. In some embodiments, for a large cluster system, network configurations may include a plurality of projects at different levels with a hierarchical structure, such as networks, subnets, pools, and interfaces. A subnet is a hub that contains overall information of the subnet and may be composed of a plurality of network pools. A network address translation rule is typically applicable to the subnet. Once a network address of the subnet is determined, all IP addresses within the subnet may be automatically translated. At this point, it is only necessary to replace the network addresses while keeping the remaining bits unchanged. Therefore, the original network address and the target network address may be subnet addresses. In some embodiments, the original network address and the target network address are network addresses of an upper-level network or a lower-level network of the subnet. The above examples are only used for describing the present disclosure, and are not intended to specifically define the present disclosure The original network address and the target network address may refer to any suitable network address part except for the host address.

In some embodiments, the computing device needs to translate the original host address in the network configuration file. When acquiring the target Internet protocol address, the computing device determines that the address translation rule indicates shifting the original host address by a predetermined value. Then, the computing device determines whether there may be a host address overflow based on the predetermined value to be drifted, which may be achieved by determining whether the original network address of the original Internet protocol address is changed. If the original network address of the original Internet protocol address is not changed, the computing device may shift the original host address of the original Internet protocol address by the predetermined value to generate the target Internet protocol address. If the original network address of the original Internet protocol address is changed, it indicates that overflow occurs in the host address, and the application of the address translation rule is prevented at this point.

At a block 308, the computing device stores the network configuration file including the target Internet protocol address in a second cluster system. After generating the adjusted network configuration file, the computing device may store the adjusted network configuration file in the second cluster system for use by the second cluster system.

Through the method, a simple Internet protocol address translation rule can be utilized to flexibly adjust network configurations in a customized and automated manner, thereby improving the processing efficiency and user experience.

Figures 4, 5, 6:
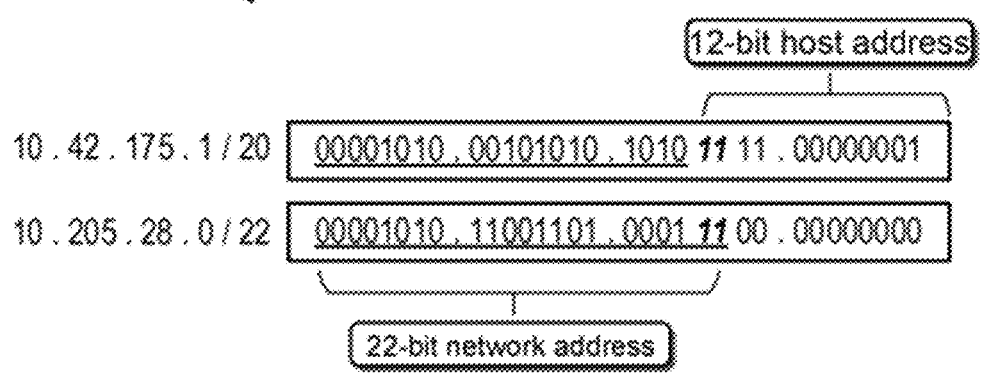
FIG. 4 illustrates a schematic diagram of an example of an address translation rule according to an embodiment of the present disclosure.
FIG. 5 illustrates a schematic diagram of an example of network address translation according to an embodiment of the present disclosure.
FIG. 6 illustrates a schematic diagram of another example of network address translation according to an embodiment of the present disclosure.

The flow chart of the method for processing a network configuration file according to the embodiment of the present disclosure has been described above with reference to FIG. 3. A plurality of rule examples and examples of adjusting the application rules are described below with reference to FIG. 4 to FIG. 8 to further describe the present disclosure in detail. FIG. 4 illustrates a schematic diagram of an example of an address translation rule according to an embodiment of the present disclosure As shown in FIG. 4, in an example 400, a network address translation rule shown is to set a subnet address with a name "groupnet0.subnet0" to "10.205.24.0/22," or if the current address is "10.205.31.0/24," set the subnet address to "10.205.28.0/22."

Alternatively or additionally, the subnet address may be replaced by either a name or a value, but usually not by both in a rule to avoid conflicts. In addition, the subnet address uses the CIDR notation. In a large cluster system with a hierarchical structure, the quantity of IP addresses may be unbearable. By specifying network addresses using the CIDR notation, a translation rule may automatically process all IP addresses within the network without the need for other complex syntax to process individual addresses. Therefore, this approach is simple and subtle. Additionally, prefix lengths of new and old network addresses may be different, as long as the IP address actually used in the translation process does not overflow. In addition, once a rule is set, the IP address ranges and gateway addresses of all network pools within the subnet may be translated correspondingly by the rule engine in the restoring or replication process. The user no longer needs to specify separate pool addresses or gateway addresses in the rule.

An example 500 of network address translation according to an embodiment of the present disclosure is described below with reference to FIG. 5. In the example column, it is assumed that the rule is translating the subnet address from the address "10.42.175.1/24" to the address "10.205.28.0/22." The new subnet address space is larger than the old subnet address space because the network prefix length becomes smaller. This does not overflow in the translation process. It is assumed that there is an address pool in the subnet with a starting address of 10.42.175.1, the translation may replace its leftmost 22 bits with the leftmost 22 bits of 10.205.28.0/22, while the remaining rightmost 10 bits remain unchanged as the host address bits. Therefore, the new translated address is 10.205.31.1, belonging to the address space of the subnet 10.205.28.0/22.

But if the rule is translating the IP address from a large subnet to a small subnet, there is a risk that the host address is too large to fit into the small network, leading to a translation failure. As shown in FIG. 6, another example 600 of network address translation according to an embodiment of the present disclosure is shown. In the example, for the rule of translating a subnet from the address "10.42.160.0/20" to the address "10.205.28.0/22," the IP address 10.42.175.1/20 may not be able to be translated because the leftmost 2 bits of its host address conflict with the rightmost 2 bits of the network address 10.205.28.0/22. Usually, in most practical use cases, the new and old subnets of the backup and restoring system have the same size (prefix length), and therefore, the translation result is very simple.

In some embodiments, the network address translation rule may further be applied to an interface address of a simple non-cluster system without a subnet. As shown in FIG. 7, a schematic diagram of an example 700 of network address translation of an interface according to an embodiment of the present disclosure is shown. In the example, the rule shown is changing the network address of the IP address on an interface "eth0" to "10.205.24.0/22" or changing the network addresses of all interface addresses from "10.205.31.0/24" to "10.205.28.0/22."

In some embodiments, if it is intended to drift the host address of an IP address by an interval without changing its network address, a host address translation rule may be adopted. FIG. 8 illustrates a schematic diagram of an example 800 of host address translation according to an embodiment of the present disclosure. A rule shown in FIG. 8 indicates that a host address on the interface "eth0" is to be drifted by 100, or all host addresses with a network address of "192.168.4.0/22" are to be drifted by 256, and thus 192.168.4.10 may be translated to 192.168.5.10. Of course, overflow is not allowed during the drift translation process, and therefore, the new IP address after the drift may still fall into the subnet.

Although the above examples all use IPv4 addresses, an IP address translation rule also supports IPv6 addresses. An IPv6 address has a network identification, a subnet identification, and an interface identification in its 128-bit address space. The network identification and/or subnet identification may be used as the network address, and the interface identification may be used as the host address. The IPv6 address may use the prefix length to define the network part of the address, which also conforms to the CIDR notation. For example, 2001:0db8:4860:0012::/64 is a valid IPv6 subnet address, and its translation method is the same as that of IPv4.

FIG. 9 illustrates a schematic block diagram of an example device 900 which can be used to implement an embodiment of the present disclosure. The nodes in the computing clusters 102 and 106 and the network 104 in FIG. 1, as well as the computing device 204 in FIG. 2, may be implemented with a device 900. As shown in the figure, the device 900 includes a central processing unit (CPU) 901 which may perform various appropriate actions and processing according to computer program instructions stored in a read-only memory (ROM) 902 or computer program instructions loaded from a storage unit 908 to a random access memory (RAM) 903. Various programs and data required for the operation of the device 900 may also be stored in the RAM 903. The CPU 901, the ROM 902, and the RAM 903 are connected to one another through a bus 904. An input/output (I/O) interface 905 is also connected to the bus 904.

A plurality of components in the device 900 are connected to the I/O interface 905 and include: an input unit 906, such as a keyboard and a mouse; an output unit 907, such as various types of displays and speakers; a storage page 908, such as a magnetic disk and an optical disc; and a communication unit 909, such as a network card, a modem, and a wireless communication transceiver. The communication unit 909 allows the device 900 to exchange information/data with other devices via a computer network, such as the Internet, and/or various telecommunication networks.

The various processes and processing described above, such as the method 300, may be executed by the processing unit 901. For example, in some embodiments, the method 300 may be implemented as a computer software program that is tangibly included in a machine-readable medium such as the storage unit 908. In some embodiments, part or all of the computer program may be loaded and/or installed onto the device 900 via the ROM 902 and/or the communication unit 909. When the computer program is loaded into the RAM 903 and executed by the CPU 901, one or more actions of the process or method 300 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, another programmable data processing apparatus, or another device, so that a series of operating steps can be performed on the computer, the other programmable data processing apparatus, or the other device to produce a computer-implemented process, such that the instructions executed on the computer, the other programmable data processing apparatus, or the other device can implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented with a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the various embodiments disclosed here.

What is claimed is:
1. A method, comprising:
    acquiring, by a system comprising at least one processor, a network configuration file of a first cluster system, the network configuration file comprising an original Internet protocol address;

acquiring, by the system, an address translation rule set by a user via a user interface, the address translation rule comprising a rule for translation of one address of an original network address and an original host address that form the original Internet protocol address;
acquiring, by the system, a target Internet protocol address by translating the one address in the original Internet protocol address based on the address translation rule, wherein acquiring the target Internet protocol address comprises:
  determining that the address translation rule indicates translation of the original network address to a target network address;
  determining a first length of the original network address and a second length of the target network address;
  comparing the first length with the second length; and
  replacing, in response to the first length being determined to be greater than or equal to the second length, a part of the original Internet protocol address corresponding to the second length with the target network address; and
storing, by the system, the network configuration file comprising the target Internet protocol address in a second cluster system.

2. The method according to claim 1, wherein acquiring the target Internet protocol address further comprises:
  determining, in response to the first length being determined to be less than the second length, whether there is a predetermined value for any bit in the original Internet protocol address corresponding to a part between the first length and the second length; and
  replacing, in response to an absence of the predetermined value for any bit in the original Internet protocol address corresponding to the part between the first length and the second length, the part of the original Internet protocol address corresponding to the second length with the target network address.

3. The method according to claim 2, wherein acquiring the target Internet protocol address further comprises:
  preventing an application of the address translation rule in response to a presence of the predetermined value for any bit in the original Internet protocol address corresponding to the part between the first length and the second length.

4. The method according to claim 1, wherein the original network address and the target network address are represented using Classless Inter-Domain Routing (CIDR) notation.

5. The method according to claim 1, wherein the original network address and the target network address are subnet addresses.

6. The method according to claim 1, wherein acquiring the address translation rule set by the user comprises:
  acquiring Internet protocol address translation information input by the user; and
  translating the Internet protocol address translation information into an address translation rule in a specified format.

7. The method according to claim 1, wherein the original Internet protocol address is an Internet Protocol Version 4 address or an Internet Protocol Version 6 address.

8. A device, comprising:
at least one processor; and
at least one memory, coupled to the at least one processor and having instructions stored thereon, wherein the instructions, when executed by the at least one processor, cause the device to perform actions comprising:
  acquiring a network configuration file of a first cluster system, the network configuration file comprising an original Internet protocol address;
  acquiring an address translation rule set by a user via a user interface, the address translation rule comprising a rule usable for translating one address of an original network address and an original host address that form the original Internet protocol address;
  acquiring a target Internet protocol address by translating the one address in the original Internet protocol address based on the address translation rule, wherein acquiring the target Internet protocol address comprises:
    determining that the address translation rule indicates shifting the original host address by a predetermined value;
    determining, based on the predetermined value, whether the original network address of the original Internet protocol address is changed; and
    shifting, in response to the original network address of the original Internet protocol address being unchanged, the original host address of the original Internet protocol address by the predetermined value to generate the target Internet protocol address; and
  storing the network configuration file comprising the target Internet protocol address in a second cluster system.

9. The device according to claim 8, wherein the original Internet protocol address and the target Internet protocol address are represented using Classless Inter-Domain Routing (CIDR) notation.

10. The device according to claim 8, wherein acquiring the target Internet protocol address further comprises:
  preventing an application of the address translation rule in response to the original network address of the original Internet protocol address being changed.

11. The device according to claim 8, wherein the original Internet protocol address is an Internet Protocol Version 4 address.

12. The device according to claim 8, wherein the original Internet protocol address is an Internet Protocol Version 6 address.

13. A computer program product, the computer program product being stored on at least one non-transitory computer-readable medium and comprising machine-executable instructions, wherein the machine-executable instructions, when executed, cause a machine to perform operations, comprising:
  acquiring a network configuration file of a first cluster system, the network configuration file comprising an original Internet protocol address;
  acquiring an address translation rule set by a user via a user interface, the address translation rule comprising a rule usable to translate one address of an original network address and an original host address that form the original Internet protocol address;
  acquiring a target Internet protocol address by translating the one address in the original Internet protocol address based on the address translation rule, wherein acquiring the target Internet protocol address comprises:
    determining that the address translation rule indicates translation of the original network address to a target network address;

determining a first length of the original network address and a second length of the target network address;

comparing the first length with the second length; and replacing, in response to the first length being determined to be greater than or equal to the second length, a part of the original Internet protocol address corresponding to the second length with the target network address; and storing the network configuration file comprising the target Internet protocol address in a second cluster system.

14. The computer program product according to claim 13, wherein acquiring the address translation rule set by the user comprises:

acquiring Internet protocol address translation information input by the user; and translating the Internet protocol address translation information into an address translation rule in a defined format.

15. The computer program product according to claim 13, wherein acquiring the target Internet protocol address further comprises:

determining, in response to the first length being determined to be less than the second length, whether there is a predetermined value for any bit in the original Internet protocol address corresponding to a part between the first length and the second length; and replacing, in response to an absence of the predetermined value for any bit in the original Internet protocol address corresponding to the part between the first length and the second length, the part of the original Internet protocol address corresponding to the second length with the target network address.

16. The computer program product according to claim 15, wherein acquiring the target Internet protocol address further comprises:

preventing an application of the address translation rule in response to a presence of the predetermined value for any bit in the original Internet protocol address corresponding to the part between the first length and the second length.

17. The computer program product according to claim 13, wherein the original network address and the target network address are represented using Classless Inter-Domain Routing (CIDR) notation.

18. The computer program product according to claim 13, wherein the original network address and the target network address are subnet addresses.

19. The computer program product according to claim 13, wherein the original Internet protocol address is an Internet Protocol Version 4 address.

20. The computer program product according to claim 13, wherein the original Internet protocol address is an Internet Protocol Version 6 address.

* * * * *